United States Patent [19]

Chiang

[11] Patent Number: 4,986,507
[45] Date of Patent: Jan. 22, 1991

[54] FREE POSITIONING TILT UNIT

[76] Inventor: Arthur Chiang, 3F, No. 19, Chih Cheng Rd., Sec. 2, Shih Lin Taipei, Taiwan

[21] Appl. No.: 427,382

[22] Filed: Oct. 27, 1989

[30] Foreign Application Priority Data

Sep. 8, 1989 [TW] Taiwan .................................. 7820873

[51] Int. Cl.⁵ .......................................... F16M 11/00
[52] U.S. Cl. ...................................... 248/291; 16/342;
403/91; 403/145; 248/923
[58] Field of Search ...................... 248/291, 292.1, 918,
248/920-923, 284; 16/337, 342; 403/91, 145,
146, 149

[56] References Cited

U.S. PATENT DOCUMENTS

| | | | |
|---|---|---|---|
| 4,489,447 | 12/1984 | Umehara | 16/342 X |
| 4,624,434 | 11/1986 | Lake, Jr. et al. | 403/146 |
| 4,781,422 | 11/1988 | Kimble | 16/337 X |
| 4,859,092 | 8/1989 | Makita | 248/923 |

FOREIGN PATENT DOCUMENTS

| | | | |
|---|---|---|---|
| 2534024 | 2/1976 | Fed. Rep. of Germany | 16/342 |
| 2186630 | 8/1987 | United Kingdom | 403/146 |

Primary Examiner—Karen J. Chotkowski
Attorney, Agent, or Firm—Lowe, Price, LeBlanc, Becker & Shur

[57] ABSTRACT

A free positioning tilt unit for use in portable computer or the like, comprises of main frame, mounting bracket element, sleeve, display unit and bushing, in which the opening, closing and positioning of the display unit is achieved by means of the revolving and positioning of the bushing in the sleeve; the bushing is secured to the display unit by means of the engagement of relative tangent planes so as to follow the display unit to move; a central through-hole is formed, when all the component parts are respectively connected together, for insert therethrough of electric wires.

2 Claims, 2 Drawing Sheets

FREE POSITIONING TILT UNIT

BACKGROUND OF THE INVENTION

In regular portable computers, the tilt unit generally utilizes a spring type of mechanism to produce torsion for the display unit the drawbacks of which may include: (1) Difficulty of securing the torque required since the manufacturing tolerance for the spring is difficult to control; (2) Difficulty of assembling because many parts are used; and (3) Different torque may result for different direction of rotation.

SUMMARY OF THE INVENTION

The present invention is to provide a free positioning tilt unit for use in a portable computer or the like, to let the display unit of the portable computer or the like to position at any angular position by means of the revolution and position of a torsion shaft on a sleeve. According to the present invention, a free positioning torsion shaft structure is comprised of a main frame, a display unit, a bushing, a sleeve and a mounting bracket element, in which the bush is secured to the display unit by means of the engagement of the external tangent plane of the bushing, and the internal tangent plane of the display unit, so as to follow the display unit to move synchronously; the mounting beacket element is fixedly mounted on the main frame having a semi-circular hole made thereon for connection thereto of the curved flange of the sleeve, the sleeve is further inserted into the bushing and the torsion shaft is received and firmly secured to the axle housing of the display unit to form a free positioning tilt unit.

DETAILED DESCRIPTION OF THE PREFERRED EMBODIMENT

Figure 1:
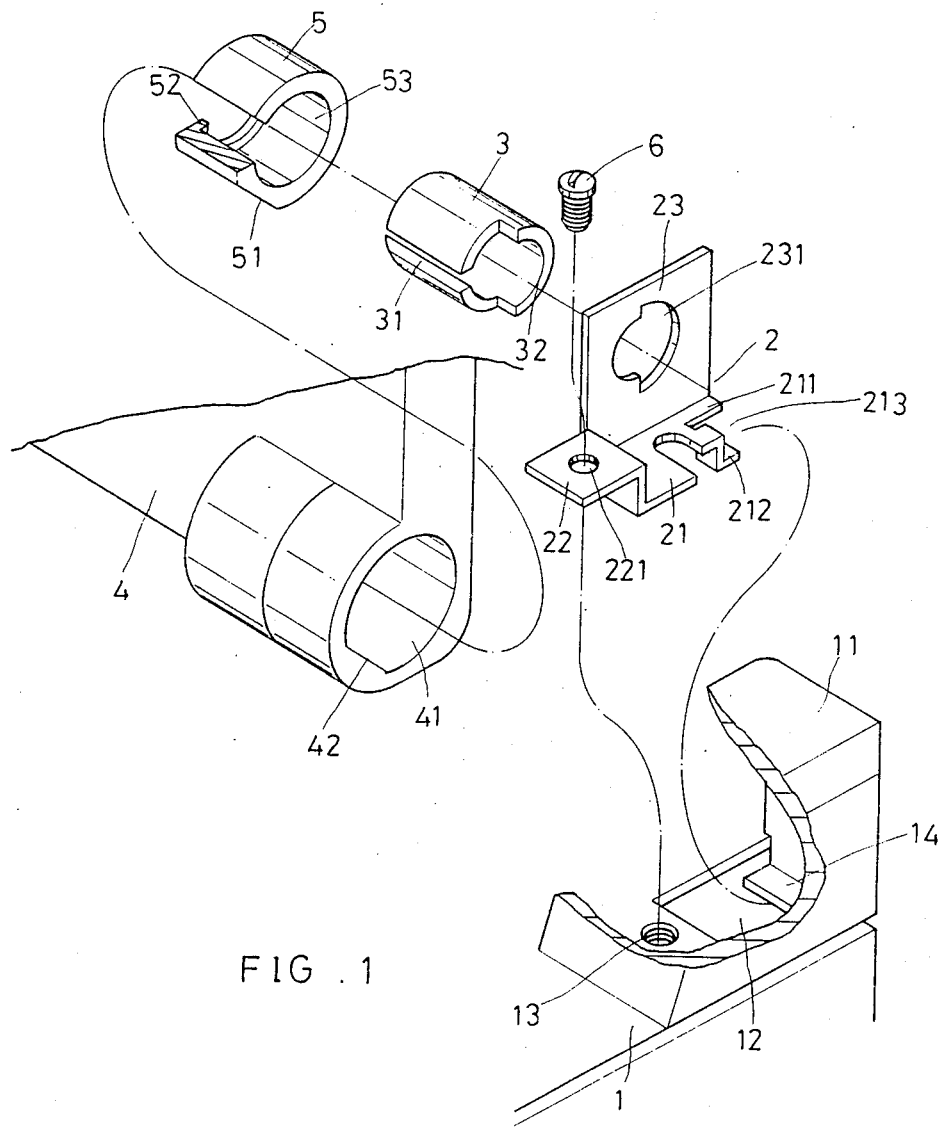
FIG. 1 is a perspective exploded view of the present invention.
Figure 2:
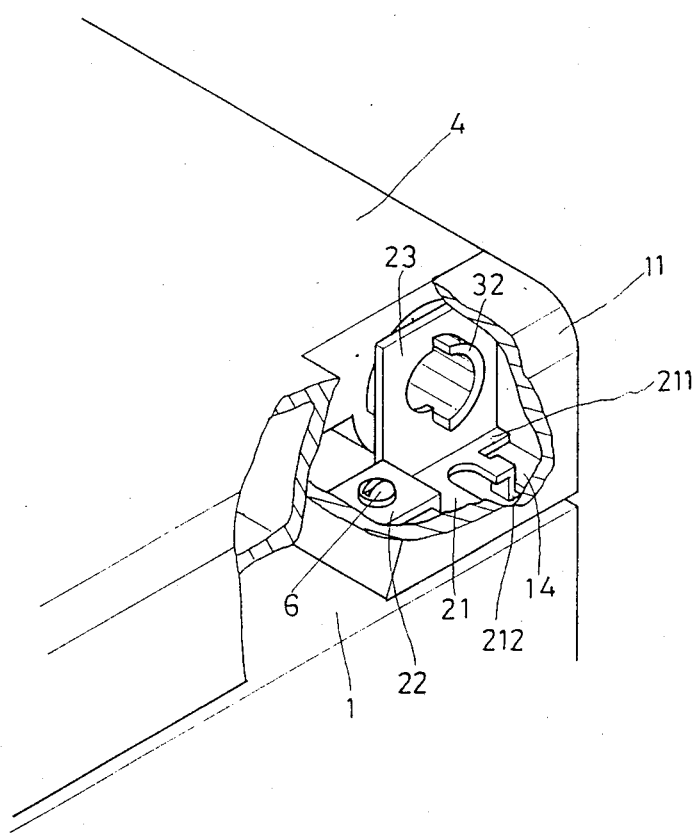
FIG. 2 is a perspective structural and partly sectional assembly view of the present invention.

Turning now to the annexed drawing in detail, therein illustrated is a free positioning torsion shaft embodying the present invention and generally comprised of a main frame (1), a mounting bracket element (2), a sleeve (3), an display unit (4), and a bushing (5).

The main frame (1) includes two frame assemblies (11) at both sides of which each comprises a notch (12), a screw hole (13), and a projecting strip (14). The mounting bracket element (2) includes a horizontal base portion (21) having an upper end surface (211) and a lower end surface (212) to define a gap (213) therebetween, a raised face portion (22) extending from the horizontal base portion and arranged at a higher level with a round hole (221) made thereon, and a vertical side-wall portion upstanding from the horizontal base portion (21) with a semi-circular hole (231) made thereon. When the mounting bracket element (2) is set in the main frame (1), the projecting strip (14) is inserted in the gap (213) between the upper end surface (211) and the lower end surface (212), and the bolt hole (13) is disposed to aim at the round hole (221) for insertion therethrough of a fastening element (6) to secure the mounting bracket element (2) to the main frame (1). The sleeve (3) includes a crevice (31) cut therethrough along axial direction, and a curved flange (32) extending therefrom at one end. When in assembly, the curved flange (32) is inserted into the semi-circular hole (231) of the mounting bracket element (2) to secure thereto. The display unit (4) includes two axle housings (41) internally at both sides of which each comprises internally a tangent plane (42). The bushing (5) comprises externally a tangent plane (51) made on the outer wall surface, and internally a flange (52) made at one end. When the bushing (5) is inserted into the axle housing (41), the external tangent plane (51) of the bushing (5) is engaged with the internal tangent plane (42) of the axle housing (41) so that the bushing (5) will follow the axle housing (41) of the display unit (4) to move synchronously. According to the present invention, the outer diameter of the sleeve (3) is slightly larger than the boring bore (53) of the bushing (5). When the sleeve (3) is inserted into boring bore (53) of the bushing (5), the sleeve (3) is forced to deform. Therefore, a constant downward pressure results from in the contact surface between the bushing (5) and the sleeve (3). When the bushing (5) and the sleeve (3) are relatively revolving against each other, a constant friction force is produced, and a constant torque can thus be obtained. Further, the display unit (4) can be positioned at any angular position by means of the torque.

Because of the crevice (31) of the sleeve (3) can be deformed elastically during it is inserted into the bushing (5). The effect of the elastic deformation forces the sleeve (3) to contact with the boring bore is of the bush closely and produces a normal force between two contact surface. This normal force generates torque to position the display unit at any angular position and this kind of design can generate same torque by no means of the rotation direction of the display unit which is rotated clockwise.

When the main frame (1) the mounting bracket element (2), the sleeve (3), the bushing (5) and the axle housing (41) of the display unit (4) are respectively assembled together, a hollow passage is formed therein for insert therethrough of electric wire from the main frame (1) to the screen (not shown) made on the display unit (4). Therefore, no additional electric wire hole is required.

According to the present invention and as an alternate for of the present invention, the bushing (5) may be secured to the axle housing (41) of the display unit (4) by means of a plurality of tangent planes or any other shapes of retaining portions respectively made on the axle housing (41) and the bushing (5). Further, the curved flange (32) of the sleeve (3) may be in a semi-circular shape or any other preferred shape according to requirement.

According to the present invention, the structure of the free positioning tilt unit may be utilized in portable computer or any other similar products.

I claim:

1. A free positioning to tilt unit, including a main frame, a mounting bracket element secured to said main frame and comprising a retaining notch made thereon for securing thereto of a sleeve; a sleeve comprising a crevice cut therethrough along an axial direction and a curved flange extending therefrom at one end; a display unit comprising an axle housing having at least one tangent plane internally made thereon for securing a bushing thereto; and a bushing comprising at least one tangent plane externally made thereon; wherein said bushing is firmly secured to said axle housing, by means of the engagement of the internal tangent plane of said axle housing and the external tangent plane of said bushing, so as to allow said display unit to move; and said sleeve is elastically deformed by means of the effect of said crevice when said sleeve is inserted into said bushing such that a constant torque is obtained during the relative rotation of said sleeve and said torsion shaft against each other.

2. The free positioning tilt unit as set forth in claim 1, wherein the curved flange of said sleeve is in a semi-circular shape.

* * * * *